G. W. HOWELL.
BEARING.
APPLICATION FILED DEC. 2, 1911.

1,054,552.

Patented Feb. 25, 1913.

Witnesses

Inventor
Guy W. Howell.
By Victor J. Evans
Attorney ated December 2, 1911. Serial No. 663,508.

UNITED STATES PATENT OFFICE.

GUY W. HOWELL, OF GLASSTON, NORTH DAKOTA.

BEARING.

1,054,552.  Specification of Letters Patent.  Patented Feb. 25, 1913.

Application filed December 2, 1911. Serial No. 663,508.

*To all whom it may concern:*

Be it known that I, GUY W. HOWELL, a citizen of the United States, residing at Glasston, in the county of Pembina and State of North Dakota, have invented new and useful Improvements in Bearings, of which the following is a specification.

This invention relates to bearings and more particularly to that type which are used to connect disks to the frames of cultivators or plows.

The object of the invention is to provide a simple and efficient bearing of this character which will be substantially dust proof, which may be readily cleaned, and which is at all times properly lubricated.

Further objects of this invention will appear as the following specific description is read in connection with the accompanying drawing, which forms a part of this application, and in which:—

Figure 1:
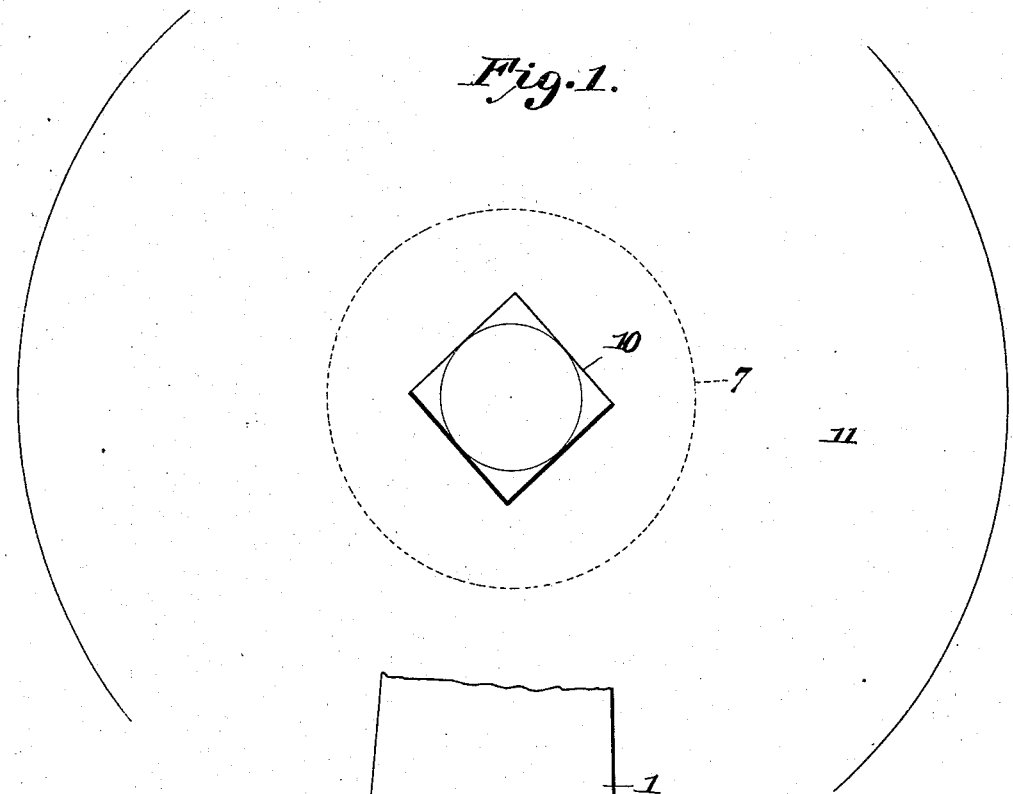
Figure 2:
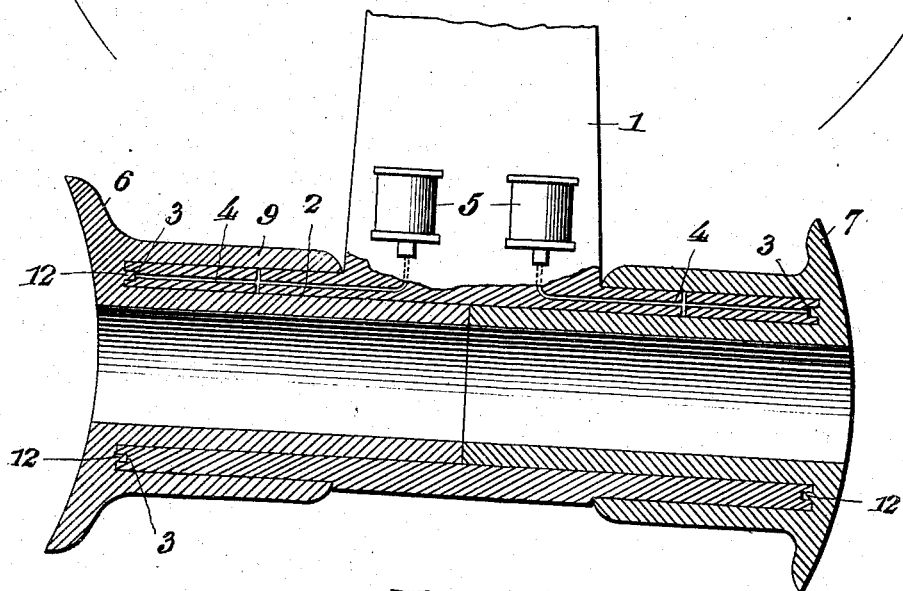

Figure 1 is a side elevation. Fig. 2 is a vertical sectional view therethrough with parts removed.

Referring more particularly to the drawing, 1 represents a substantially cruciformed standard or shank which has secured to its lower end a tubular body 2 which extends upon the opposite sides of the standard and has the end walls thereof grooved or recessed, as shown at 3, and the upper portion thereof provided with a longitudinal channel 4 which communicates with the grooves or recesses at one end and at the opposite end with suitable oil cups 5. The disk supports comprise concave and convex heads 6 and 7 which are provided with longitudinally extending parallel tubes 8 and 9, the former of which are somewhat longer than the latter and abut inside of the tubular mounting head or body 2 which extends between the tubes 8 and 9. Passing through the tubes 8 is a clamping bolt 10 which is adapted to connect the disks 11 at opposite ends of the device. The heads 6 and 7 are provided with annular ribs 12 which are arranged in between the tubes 8 and 9 and are adapted to enter the annular grooves or recesses 3 in the end of the tubular body 2. As shown, the inner tubes 8 abut each other so that when the bolt is in operative position to clamp the disks to the heads, the separate parts of the bearing will be prevented from relative rotary movement. In the present type of bearing, the tubular body 2 is an axle, the separate heads with their associated tubes form the hub and the bolt passing therethrough acts to hold the hub upon the axle and to clamp the disks upon the hub.

What is claimed is:—

A bearing comprising a tubular body having at its end an annular groove and an oil channel leading through the body to said groove, a tube surrounding the body and having a portion which extends into the body, said tube being free to rotate upon the body, the tube having an annular rib which fits snugly in the groove and which closes the end of the oil channel.

In testimony whereof I affix my signature in presence of two witnesses.

GUY W. HOWELL.

Witnesses:
 ROBERT STRACHON,
 HARRY E. GIBSON.

Copies of this patent may be obtained for five cents each, by addressing the "Commissioner of Patents, Washington, D. C."